(12) United States Patent
Kim

(10) Patent No.: US 9,599,540 B2
(45) Date of Patent: Mar. 21, 2017

(54) SYSTEM AND METHOD FOR MEASURING CONICITY USING FOUR FORCE-SENSORS

(71) Applicant: Hankook Tire Co., Ltd., Seoul (KR)

(72) Inventor: Youn Ki Kim, Daejeon (KR)

(73) Assignee: Hankook Tire Co., Ltd., Seoul (KR)

( * ) Notice: Subject to any disclaimer, the term of this patent is extended or adjusted under 35 U.S.C. 154(b) by 405 days.

(21) Appl. No.: 14/088,274

(22) Filed: Nov. 22, 2013

(65) Prior Publication Data

US 2014/0149073 A1    May 29, 2014

(30) Foreign Application Priority Data

Nov. 27, 2012 (KR) .......................... 10-2012-0135406

(51) Int. Cl.
*G01M 17/02* (2006.01)
*G01L 5/12* (2006.01)
*G01L 5/16* (2006.01)

(52) U.S. Cl.
CPC ............... *G01M 17/02* (2013.01); *G01L 5/12* (2013.01); *G01L 5/16* (2013.01); *G01M 17/021* (2013.01)

(58) Field of Classification Search
CPC ..................................................... G01M 17/02
USPC ......................................................... 702/167
See application file for complete search history.

(56) References Cited

U.S. PATENT DOCUMENTS

| | | | | |
|---|---|---|---|---|
| 4,095,374 A * | 6/1978 | Ugo | ........................ | B24B 5/366 451/1 |
| 4,112,630 A * | 9/1978 | Brown, Jr. | ............... | B24B 5/366 451/1 |
| 4,912,882 A * | 4/1990 | Makino | ................ | G01M 17/024 451/254 |
| 4,984,393 A * | 1/1991 | Rogers, Jr. | ........... | G01M 17/024 451/26 |
| 5,309,377 A * | 5/1994 | Beebe | .................. | G01M 17/022 702/105 |
| 5,614,676 A * | 3/1997 | Dutt | ...................... | G01M 17/022 702/56 |
| 5,645,465 A * | 7/1997 | Vannan, III | ......... | G01M 17/024 451/10 |
| 6,386,945 B1 * | 5/2002 | Fahringer | ................ | B24B 5/366 451/10 |
| 2003/0061719 A1 * | 4/2003 | Gerdes | ................... | G01M 1/045 33/203.13 |
| 2010/0281968 A1 * | 11/2010 | Kubota | .................... | B60C 13/00 73/146 |
| 2013/0080077 A1 * | 3/2013 | Meyer | ................... | G01M 1/045 702/41 |

* cited by examiner

*Primary Examiner* — Manuel L Barbee
*Assistant Examiner* — Raymond Nimox
(74) *Attorney, Agent, or Firm* — Blakely, Sokoloff, Taylor & Zafman LLP

(57) ABSTRACT

The present invention relates to a system and method for measuring conicity using four force-sensors, in which a spindle attached to a tire and four sensors are used to measure lateral force generated in the tire; individual signals measured by the four sensors of the spindle are amplified; a DAQ board for calculating Fy(LFV) obtained by summing the individual signals amplified by an amplifier is calculated, obtaining five signals generated in the amplifier, and converting the analog signals into digital signals is provided; and the conicity is calculated using the digital signals, a predefined delta load and a factor.

3 Claims, 5 Drawing Sheets

SYSTEM AND METHOD FOR MEASURING CONICITY USING FOUR FORCE-SENSORS

BACKGROUND OF THE INVENTION

1. Field of the Invention

The present invention relates to a system and method for measuring conicity using four force-sensors, in which a spindle attached to a tire and four force-sensors are used to measure lateral force generated in the tire, individual signals measured by the four force-sensors of the spindle are amplified, a data acquisition (DAQ) board for converting an analog signal measured by the four force-sensors into a digital signal is prepared, and the digital signal, a delta load and a factor are used to calculate the conicity.

2. Description of the Related Art

A tire is manufactured using a number of half-finished products such as a tread, a belt, a carcass, a bead, etc., and thus has a roundness defect. To evaluate roundness or uniformity, most tires are subjected to uniformity testing.

Such characteristics are referred to as non-uniformity, and can be broadly classified according to stiffness, size and mass. Thus, non-uniformity of a tire is measured with respect to each of stiffness, size and mass.

If non-uniformity is too low or high, there are problems of vehicle vibration. Particularly, conicity affects leaning of the vehicle and is calculated from lateral force measured by a sensor, as shown in FIG. 2.

Devices for measuring uniformity of a tire include low speed and high-speed uniformity devices. These two devices are classified according to measurement capability within a speed range wherein vibration most often occurs under real world driving conditions. In general, a low-speed uniformity device can measure uniformity of a tire at a speed of less than 60 RPM (4~7 km/h), while a high-speed uniformity device can measure uniformity of a tire at a speed of 60 RPM (200 km/h) or higher.

Taking device costs, measurement cycle speed, measuring methods, etc. into account, low-speed uniformity devices have generally been to evaluate products manufactured in a factory line, while high-speed uniformity devices have generally been used for the purpose of research.

A typical high-speed uniformity device employs eight force sensors in a spindle so as to measure conicity, and uses the equation shown in FIG. 4 in order to calculate conicity.

SUMMARY OF THE INVENTION

An aspect of the present invention is to remarkably reduce costs in manufacturing and maintaining a system and to achieve rapid measurement of conicity of a tire by calculating conicity using values measured by four force-sensors instead of eight sensors.

Another aspect of the present invention is to provide a system and method for measuring conicity, in which a new algorithm, which the present inventors have researched and developed, for calculating conicity using values measured by four force-sensors, thereby providing good repetitiveness in measurement results and thus improving reliability.

In accordance with one aspect of the present invention, there is provided a system for measuring conicity using four lateral force sensors, in which a spindle attached to a tire and four force-sensors are used to measure lateral force generated in the tire, individual signals measured by the four sensors provided to the spindle are amplified, a data acquisition (DAQ) board is provided for conversion of analog signals measured by four force-sensors into digital signals, and conicity is calculated using the digital signals, a predefined delta load, and a factor.

In accordance with another aspect of the present invention, there is provided a method of measuring conicity using four lateral force sensors, including: measuring lateral force generated in a tire using a spindle attached to a tire and four force-sensors; amplifying individual signals measured by the four sensors provided to the spindle at regular intervals; converting four analog signals amplified by an amplifier into digital signals using a data acquisition (DAQ) board provided with an analog/digital (A/D) converter; and calculating the conicity using four measured values, a value obtained by summating the four measured values, a predefined delta load and a factor.

In accordance with a further aspect of the present invention, there are provided a system and method for measuring conicity using four force-sensors, in which conicity is calculated by a DAQ board processing the following equations (1), (2) and (3), the DAQ board being internally provided with an A/D converter and including an embedded control program in a memory:

$$Fy(LFV) = (Y1+Y2+Y3+Y4)/4 \qquad (1),$$

$$Fy(LFD) = (-Y1+Y2+Y3-Y4)/4 - \text{Delta Load} \times \text{factor} \qquad (2),$$

$$\text{Conicity} = (LFD\text{cw} + LFD\text{ccw})/2 \qquad (3),$$

where LFD cw is an average value of lateral force generated when the tire is rotated in the clockwise direction, LFD ccw is an average value of lateral force generated when the tire is rotated in the counterclockwise direction; and in Equation (2), the delta load of the tire is set within a testing load range of 400~800 kgf, and the factor is set within a range of 0.004~0.009 when a full range of Fy is 20000 N.

BRIEF DESCRIPTION OF THE DRAWINGS

The above and other aspects, features and advantages of the present disclosure will become apparent from the following description of exemplary embodiments given in conjunction with the accompanying drawings, in which.

DESCRIPTION OF THE EMBODIMENTS

Embodiments of the present invention will be described in detail.

Figure 1:
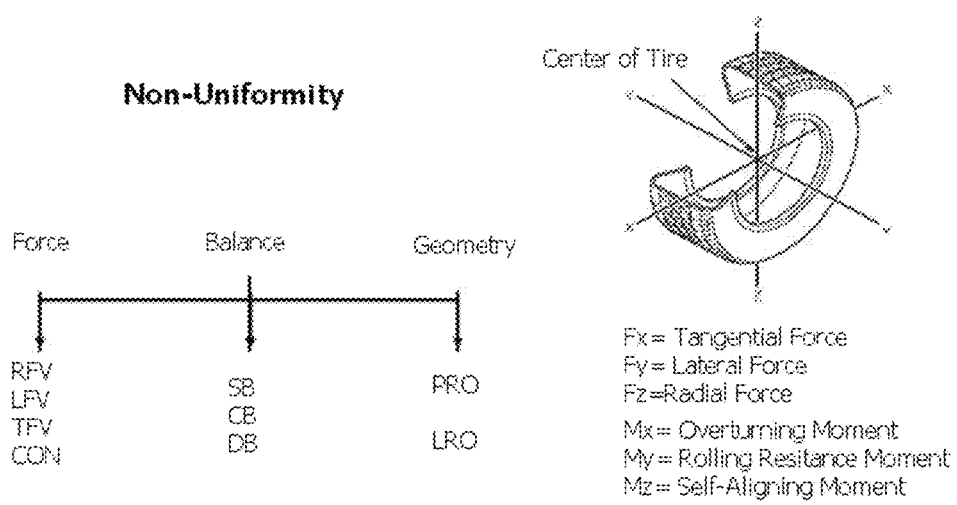
FIG. 1 shows non-uniformity of a tire.
Figure 2:
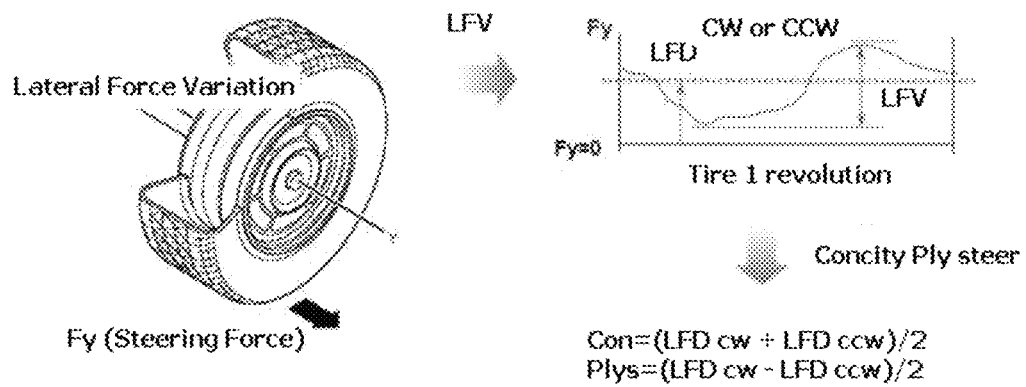
FIG. 2 shows a method of measuring and calculating conicity of a tire.

FIG. 1 shows non-uniformity of a tire, and FIG. 2 shows a method of measuring and calculating conicity of a tire.

Figure 3:
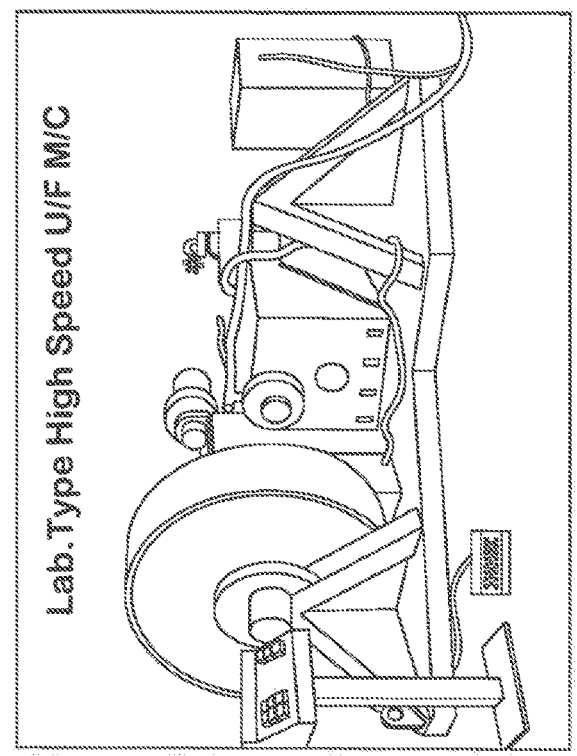
FIG. 3 shows a low-speed/high-speed uniformity device.
Figure 3:
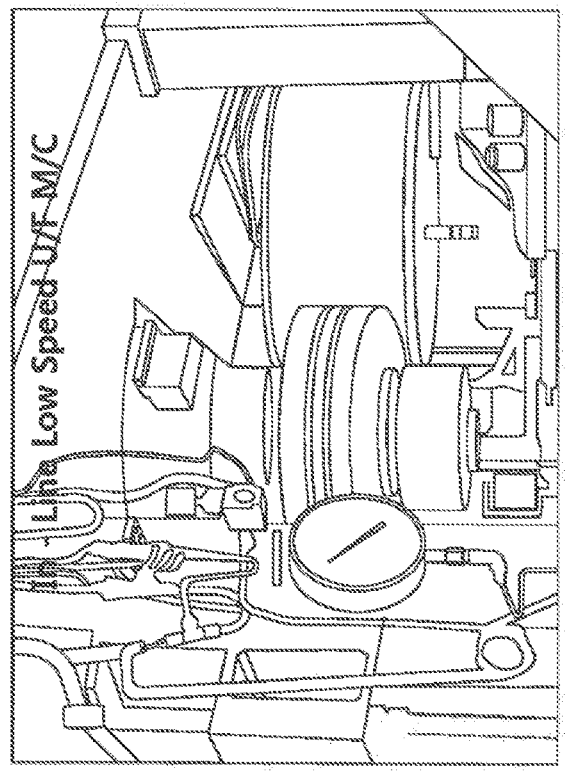
Figure 4:
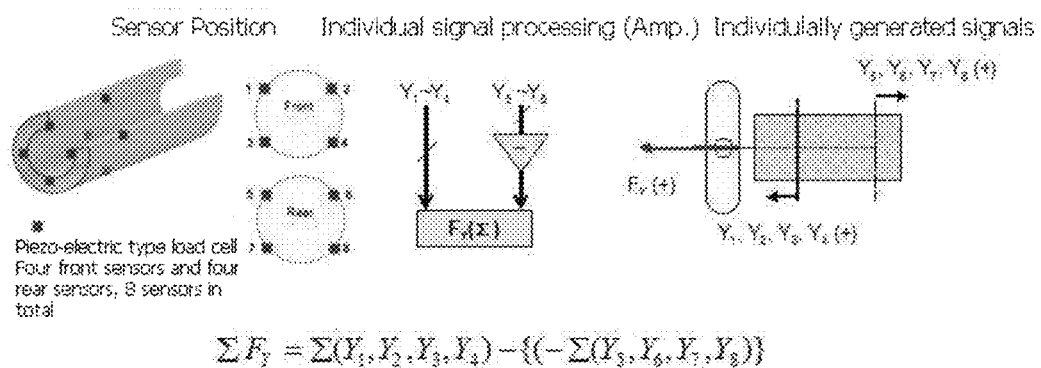
FIG. 4 shows a method and equation for measuring conicity using eight force sensors.

FIG. 3 shows low-speed/high-speed uniformity devices, and FIG. 4 shows a method and equation for measuring conicity using eight force sensors.

Figure 5:
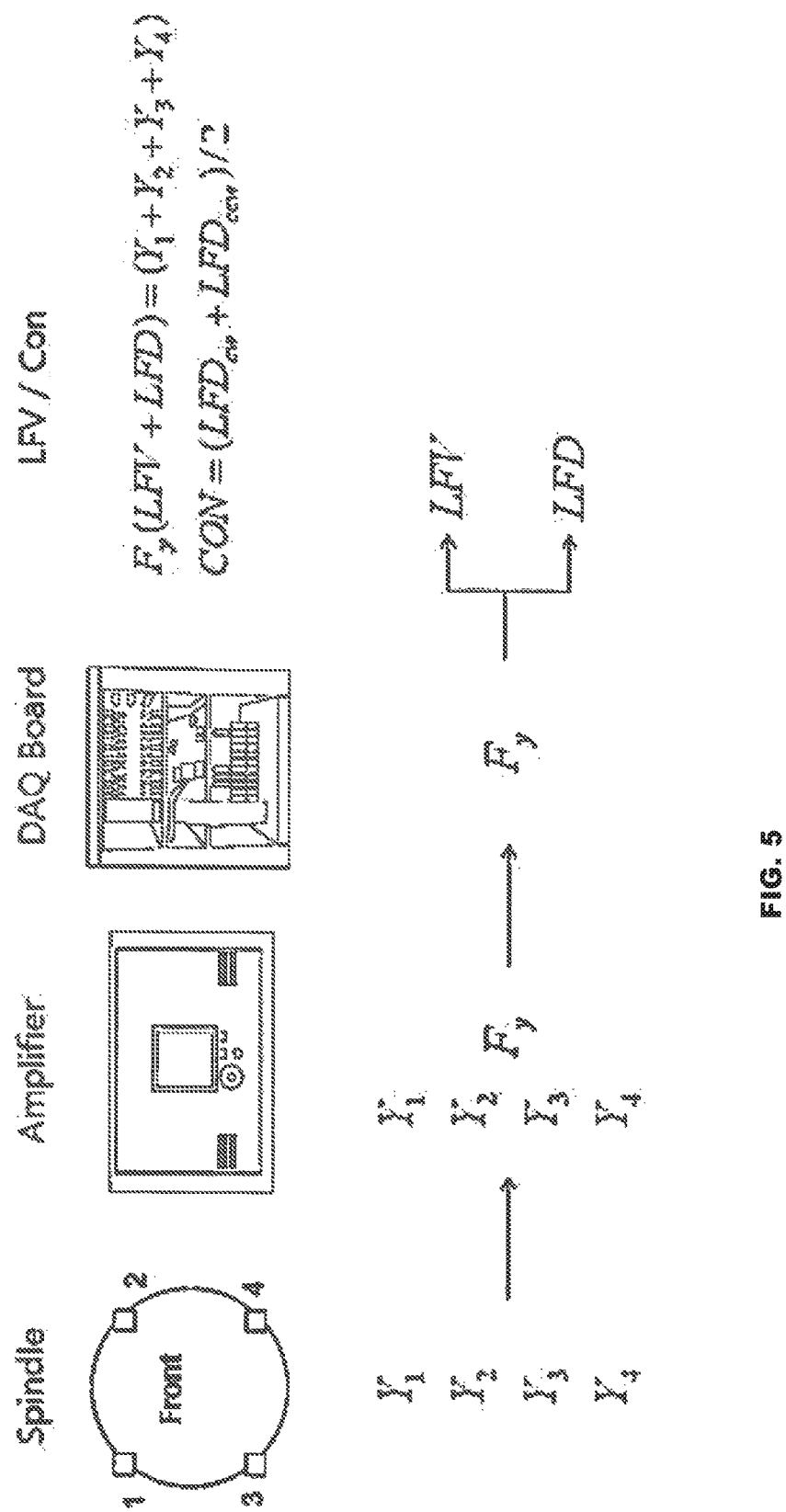
FIG. 5 shows a method and equation for measuring conicity using four force-sensors according to one embodiment of the present invention.

FIG. 5 shows a method and equation for measuring conicity using four force-sensors according to one embodiment of the present invention.

Based on data illustrated in the drawings and listed in the tables, one embodiment of the present invention will be described in detail.

Table 1 shows conicity measured by eight sensors and conicity measured by four sensors for comparison.

TABLE 1

| | Results of measuring conicity | |
|---|---|---|
| | Using eight sensors | Using four sensors |
| Test 1 | 1.64 | 2.03 |
| Test 2 | 1.73 | 0.85 |
| Test 3 | 1.96 | −0.05 |
| Test 4 | 1.89 | −2.10 |
| Test 5 | 1.86 | −3.32 |
| Test 6 | 2.27 | −5.67 |
| Test 7 | 1.72 | −8.78 |
| Test 8 | 2.63 | −11.25 |
| Test 9 | 1.86 | −15.34 |
| Test 10 | 2.00 | −20.21 |
| Average | 1.96 | −6.38 |
| Deviation | 0.28 | 7.02 |
| Range | 0.99 | 22.24 |

Table 1 shows conicity of tires (P215/65R16 H417) measured at a spindle using eight sensors and at a spindle using four sensors, and shows that conicity measured using four force-sensors exhibited low precision.

As shown in Table 1, it can be seen that the four force-sensors were incapable of precisely measuring the conicity.

In the case of using four force-sensors, lateral force is measured by elements shown in FIG. 5 to obtain lateral force variation (LFV) and lateral force deviation (LFD) (average value of lateral force), and the conicity is calculated using the LFD.

LFD cw is an average value of lateral force generated when the tire is rotated in the clockwise direction and LFD ccw is an average value of lateral force generated when the tire is rotated in the counterclockwise direction.

To solve the problems mentioned above, a system according to one embodiment of the invention additionally includes a data acquisition (DAQ) board, as shown in FIG. 5.

According to the invention, the equations for calculating LFV and LFD using measured lateral force is programmed and applied through research.

That is, the present invention may be implemented by executing the program researched and developed by the present inventors on a computer or server.

The conicity may be obtained using the LFD of Equations (1), (2) and (3), the delta load of the LFD is a "Reference Load−testing load", and a factor can be obtained using an actual tire.

Here, the delta load (reference load) may be set within a testing load range of 400~800 kgf of the tire, and the factor may be set within a range of 0.004~0.009 when a full range of Fy is 20000 N.

Hereinafter, the system for measuring conicity according to the embodiment of the invention will be described in more detail.

1. A spindle is provided with four force-sensors and is mounted to a tire/wheel assembly, and lateral force generated by the corresponding assembly is measured by four force-sensors (Y1, Y2, Y3, Y4).

2. An amplifier amplifies individual signals measured by the four force-sensors provided to the spindle at regular intervals. The amplifier has an offset function.

3. A DAQ Board serves to convert analog signals amplified by an amplifier into digital signals. If the measured signals are large, the signals may be directly converted into digital signals without amplification. The individual signals measured by the four force-sensors and converted into digital signals are all summated into Fy (LFV).

4. The DAQ Board includes a memory with an embedded control program for calculating a result value using a calculation program for processing five signals including the signals measured by the four force-sensors and a value obtained by summating the four measured signals, individually (Fy) or together (Y1, Y2, Y3, Y4) (as in Equations (1), (2) and (3)).

A microprocessor for executing the control program embedded in the memory is disposed within the DAQ Board.

$$Fy(LFV)=(Y1+Y2+Y3+Y4)/4 \quad (1)$$

$$Fy(LFD)=(-Y1+Y2+Y3-Y4)/4-\text{Delta Load}\times\text{factor} \quad (2)$$

$$\text{Conicity}=(LFDcw+LFDccw)/2 \quad (3)$$

In the above equations, Y1, Y2, Y3 and Y4 are as follows. Among the four force-sensors inserted into the spindle at regular intervals as shown in FIG. 5, y-axial force measured at a position 1 is Y1, y-axial force measured at a position 2 is Y2, y-axial force measured at a position 3 is Y3, and y-axial force measured at a position 4 is Y4.

Equation (1) is an average of values obtained by summing the y axial force Y1, Y2, Y3, Y4 measured by the force sensors in the spindle.

Here, the LFD cw is an average value of lateral force generated when the tire is rotated in the clockwise direction, and the LFD ccw is an average value of lateral force generated when the tire is rotated in the counterclockwise direction.

According to the embodiment of the invention, the four force-sensors provided to the spindle measure force in all directions of x, y and z axes. In this embodiment, force in the y axial direction is used.

In Equation (2), the delta load of the tire may be set within a testing load range of 400~800 kgf, and the factor may be set within a range of 0.004~0.009 when a full range of Fy is 20000 N.

Using the system and method for measuring and calculating conicity according to the embodiment of the invention, repetitiveness of the conicity is calculated, as shown in Table 2. As is readily apparent from the results shown in Table 2, the inventive four-sensor conicity measurement method is far superior to the conventional four-sensor conicity measurement method.

Additionally, it can be seen that the repetitiveness is the same as or better than that of the results obtained using eight sensors.

TABLE 2

| | Results of measuring conicity | | |
|---|---|---|---|
| | Using eight sensors | Using four sensors (conventional) | Using four sensors (inventive) |
| Test 1 | 1.64 | 2.03 | 1.72 |
| Test 2 | 1.73 | 0.85 | 1.83 |
| Test 3 | 1.96 | −0.05 | 1.91 |
| Test 4 | 1.89 | −2.10 | 1.82 |
| Test 5 | 1.86 | −3.32 | 1.63 |
| Test 6 | 2.27 | −5.67 | 1.54 |
| Test 7 | 1.72 | −8.78 | 2.12 |
| Test 8 | 2.63 | −11.25 | 1.98 |
| Test 9 | 1.86 | −15.34 | 2.34 |
| Test 10 | 2.00 | −20.21 | 1.78 |
| Average | 1.96 | −6.38 | 1.87 |

TABLE 2-continued

Results of measuring conicity

| | Using eight sensors | Using four sensors (conventional) | Using four sensors (inventive) |
|---|---|---|---|
| Deviation | 0.30 | 7.02 | 0.24 |
| Range | 0.99 | 22.24 | 0.80 |

That is, the system for measuring conicity using four force-sensors according to the embodiment of the invention shows similar results to that obtained using eight force sensors.

According to the embodiment of the invention, the conicity of the tire, which has conventionally been measured using eight force sensors, can be calculated with the values measured using four force-sensors, thereby remarkably reducing costs associated with system maintenance and manufacture.

Further, the results obtained using four force-sensors according to the inventive method exhibit excellent repetitiveness, thereby improving reliability.

According to the embodiment of the present invention, there are provided a system and method for measuring conicity, in which four force-sensors and the spindle attached to the tire are used to measure lateral force generated in the tire; individual signals measured by the four force-sensors of the spindle are amplified; the DAQ board for converting analog signals amplified by an amplifier into digital signals is provided; and the conicity is calculated based upon the measured values using the digital signals, a delta load and a factor, thereby significantly reducing installation and maintenance costs and thus having high industrial applicability.

Although the present invention has been described and illustrated in connection with the exemplary embodiments, it will be apparent to those skilled in the art that various modifications and changes can be made thereto without departing from the spirit and scope of the present invention defined by the appended claims.

What is claimed is:

1. A method of measuring conicity, comprising:
measuring lateral force generated in a tire using four lateral force-sensors attached to a spindle at regular intervals about the spindle, wherein each lateral force-sensor measures a lateral force at a corresponding position of the spindle generated during rotation of the tire;
amplifying individual signals measured by the lateral four force-sensors via an amplifier;
converting four analog signals amplified by the amplifier into digital signals using a data acquisition (DAQ) board provided with an analog/digital (A/D) converter; and
generating a conicity value by a microprocessor executing a control program embedded in a memory of the DAQ board, the conicity value generated using values measured by the four lateral force-sensors, a value obtained by summing the values measured by the four lateral force-sensors, a predefined delta load, and a factor;
wherein, when values of the individual signals measured by the four lateral force-sensors are Y1, Y2, Y3 and Y4, respectively, the conicity is generated by the control program executed by the microprocessor by the following equations (1), (2) and (3);

$$Fy(LFV)=(Y1+Y2+Y3+Y4)/4 \quad (1),$$

$$Fy(LFD)=(-Y1+Y2+Y3-Y4)/4\text{-Delta Load}\times\text{factor} \quad (2),$$

$$\text{Conicity}=(LFDcw+LFDccw)/2 \quad (3),$$

wherein, value of Delta load is set within 400~800 kgf in a scope of the tire test load; the value of the factor is, if the full range is 20000 N, it set the range between 0.004 to 0.009, LFDcw is an average value of the lateral force generated during clockwise rotation, and LFDccw is an average value of the lateral force generated during counterclockwise rotation.

2. A system for measuring conicity comprising:
four lateral force-sensors attached to a spindle at regular intervals about the spindle,
wherein the four lateral force-sensors measure lateral force at four positions of a tire generated during rotation of the tire;
a means for obtaining a value by summing four signals after a data acquisition (DAQ) board provided with an analog/digital (A/D) converter converts individual signals measured by the four lateral force-sensors into digital signals; and
a means for calculating the conicity using the measured digital signals, a predefined delta load, and a factor;
wherein, when values of the individual signals measured by the four lateral force-sensors are Y1, Y2, Y3 and Y4, respectively, the conicity is calculated by the following equations (1), (2) and (3);

$$Fy(LFV)=(Y1+Y2+Y3+Y4)/4 \quad (1),$$

$$Fy(LFD)=(-Y1+Y2+Y3-Y4)/4\text{-Delta Load}\times\text{factor} \quad (2),$$

$$\text{Conicity}=(LFDcw+LFDccw)/2 \quad (3),$$

wherein, value of Delta load is set within 400~800 kgf in a scope of the tire test load; the value of the factor is, if the full range is 20000 N, it set he range between 0.004 to 0.009, LFDcw is an average value of the lateral force generated during clockwise rotation, and LFDccw is an average value of the lateral force generated during counterclockwise rotation.

3. The system according to claim 2, further comprising: a signal amplifier amplifying the individual signals measured by the four lateral force-sensors.

* * * * *